May 23, 1967 W. E. BLUME 3,321,063
MATERIAL DISPATCHING SYSTEM
Filed Dec. 8, 1965 3 Sheets-Sheet 1
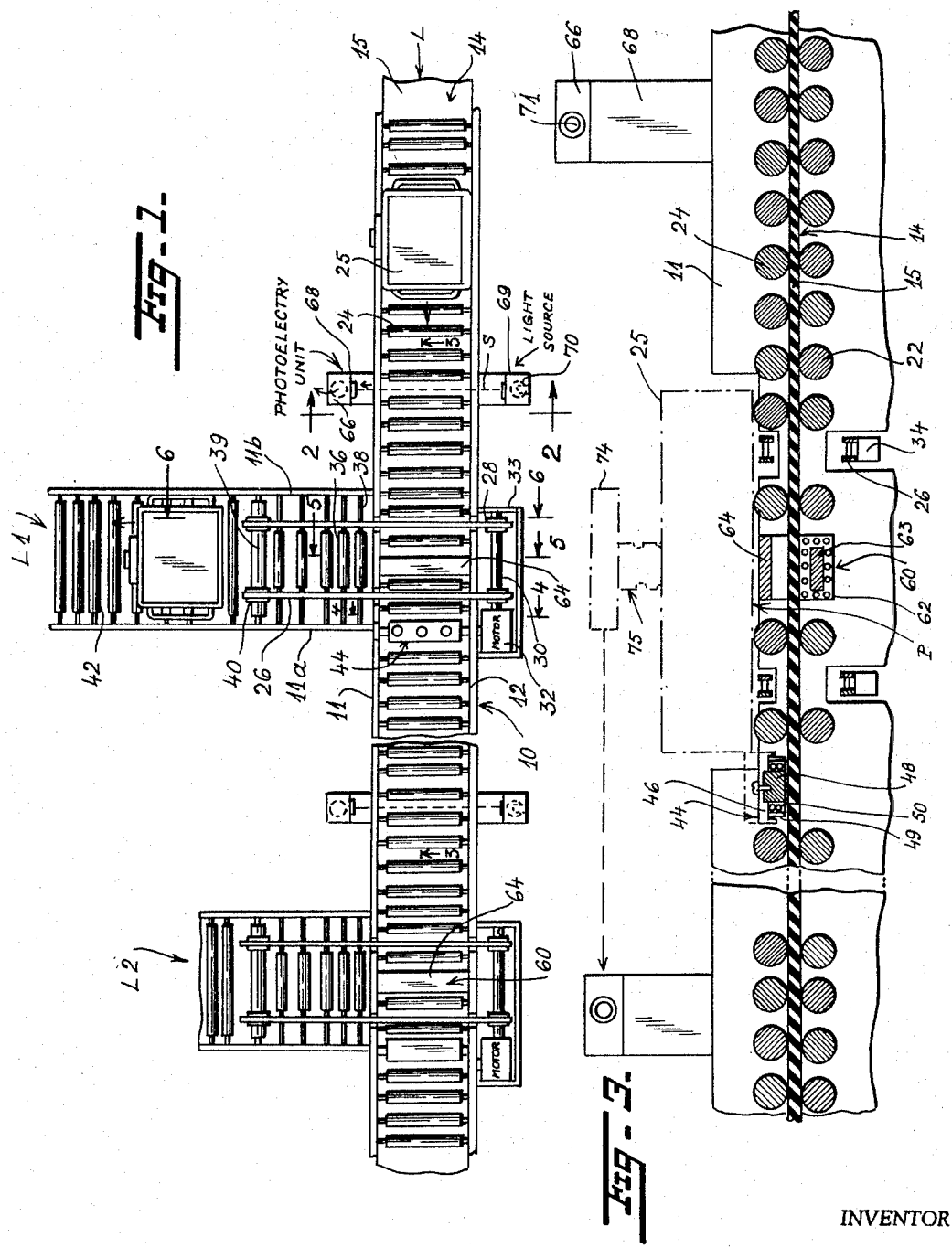
INVENTOR
William E. Blume
BY Polachek & Saulsbury
ATTORNEYS May 23, 1967 W. E. BLUME 3,321,063
MATERIAL DISPATCHING SYSTEM
Filed Dec. 8, 1965 3 Sheets-Sheet 2
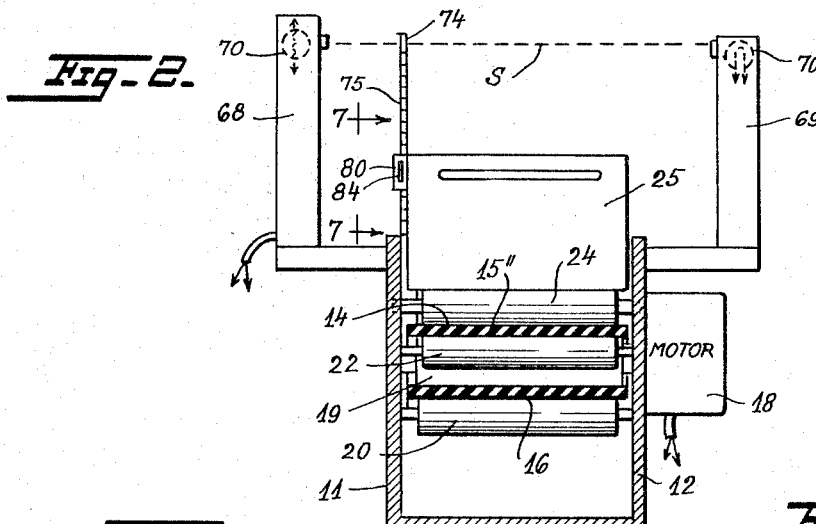
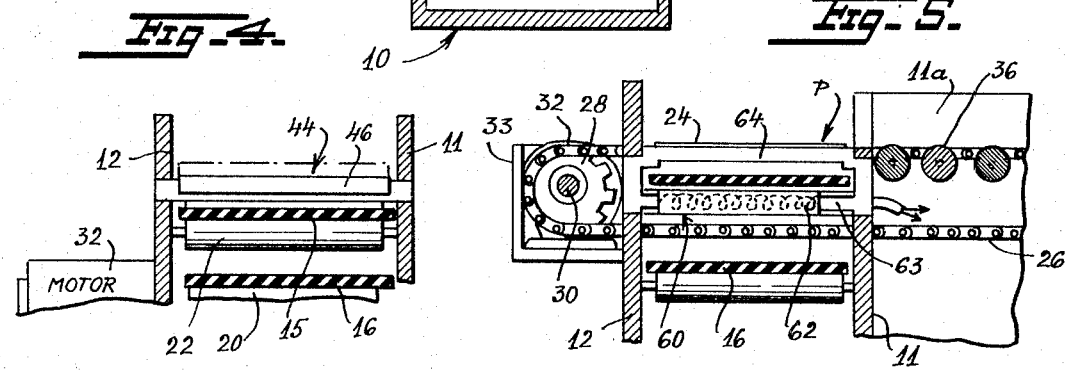
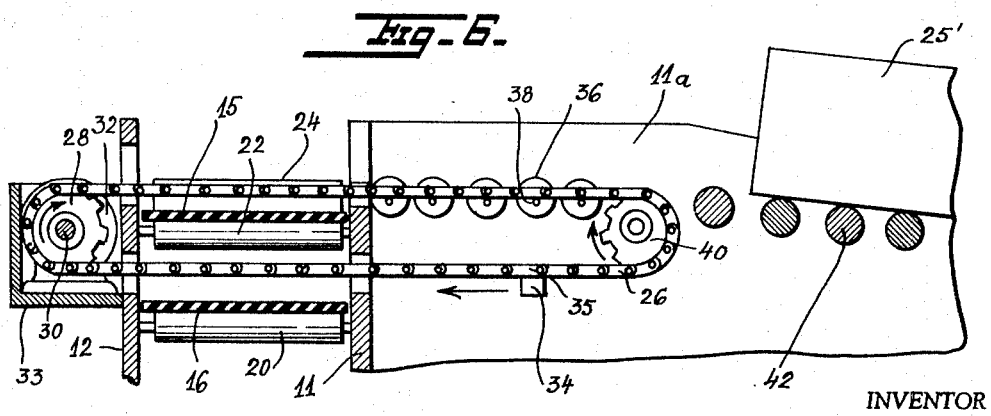
INVENTOR
William E. Blume
BY Polachek & Saulsbury
ATTORNEYS

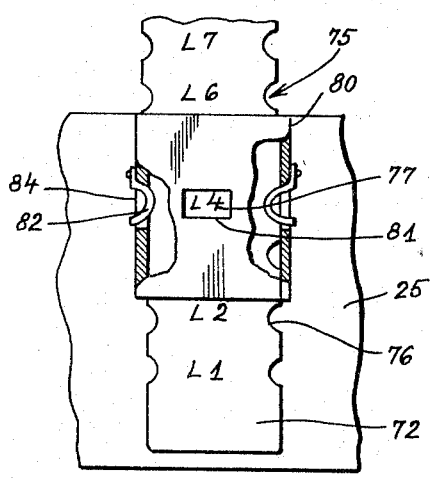
Fig-7-
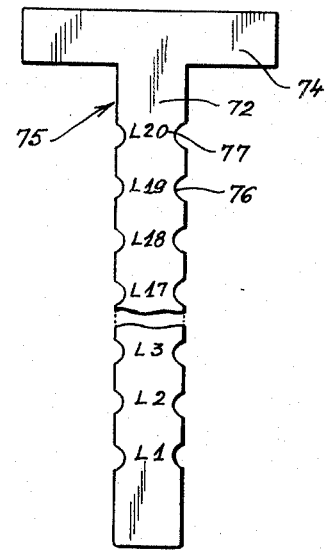
Fig-8-
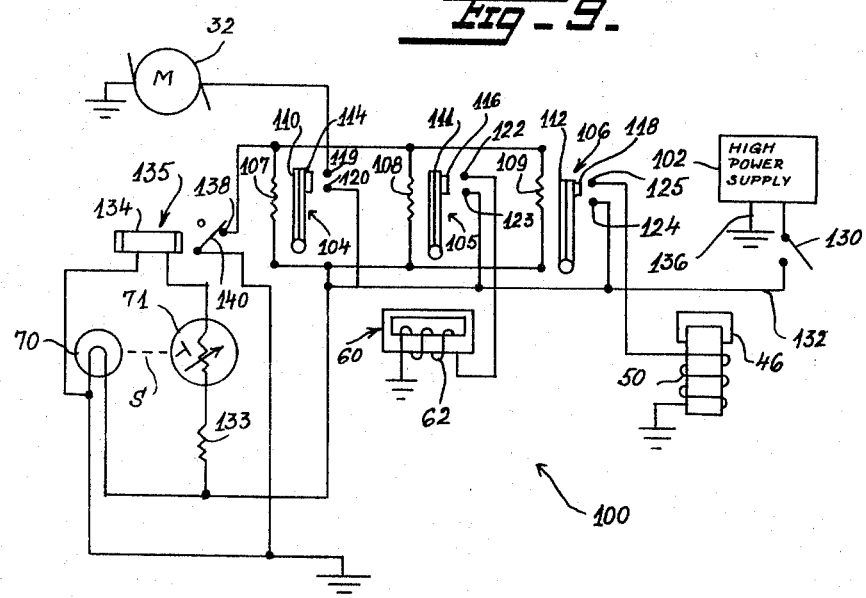
Fig-9-
INVENTOR
William E. Blume
BY
Polachek & Saulsbury
ATTORNEYS

United States Patent Office 3,321,063
Patented May 23, 1967

3,321,063
MATERIAL DISPATCHING SYSTEM
William E. Blume, 126—13 101st Ave.,
Richmond Hill, N.Y. 11419
Filed Dec. 8, 1965, Ser. No. 512,305
2 Claims. (Cl. 198—38)

This invention relates to conveyor systems and more particularly to photoelectricity controlled switching and transfer apparatus for selectively and automatically distributing containers from a main conveyor line to branch lines.

When the containers on a main conveyor line are heavily loaded and weigh a hundred pounds or more, difficulty is often encountered in stopping a container precisely at the entrance to the branch line where the container is to be transferred. Elaborate mechanical arrangements including complex switching systems have heretofore been proposed for use with lightly loaded containers, but they are not effective or operable with heavily loaded containers. Their complexity is objectionable because of high installation cost and frequently required servicing. The prior distribution systems for containers on conveyors also employ complex coding arrangements to identify and sort containers, and often require expensive electronic computers with elaborate programming to operate.

The present invention is directed at avoiding the complexity, high installation cost, frequent servicing and other difficulties and disadvantages of prior conveyor systems by relatively simple means.

One object of the invention is to provide container distribution apparatus for a conveyor system, with means for safely, effectively and automatically handling heavily loaded containers, including means for positively stopping movement of containers along a main conveyor line, precisely at the entrances to branch lines to which the containers are to be transferred.

A further object is to provide photoelectric means for triggering operation of the container stopping means and for actuating a transfer mechanism only when a container destined for a particular branch line arrives at that branch line.

In the accompanying drawings forming a material part of this disclosure:

FIGURE 1 is a top plan view of part of a multiple branch conveyor system embodying the invention.

FIGS. 2–6 are enlarged fragmentary sectional views taken on line 2—2, 3—3, 4—4, 5—5 and 6—6, respectively, of FIG. 1.

FIG. 7 is a further enlarged fragmentary side view of a container and branch line selector member, parts being broken away.

FIG. 8 is an enlarged side view of a branch line selector member, a portion being broken away.

FIG. 9 is a diagram of an electric circuit employed in the conveyor system.

Referring first to FIGS. 1–6, there is shown a conveyor system including a framework 10 having vertical parallel side walls, 11, 12. These walls define a main line L of the system. An endless conveyor belt 14 of any desired length is arranged so that upper and lower courses or sections 15, 16 are parallel to each other one above the other and spaced apart. The two courses are movably disposed in horizontal planes between the walls 11, 12. The belt is driven by a motor 18 which drives a roller 19 on which the belt is entrained at one end. The other end of the belt is entrained on an idler roller (not shown).

The lower course 16 is supported by idler rollers 20 journaled to rotate freely in the side walls 11, 12. The upper course 15 is supported by idler rollers 22. Just above the rollers 22 in contact with the belt are rollers 24. These rollers are driven by the belt and rotate as the belt passes between rollers 22, 24. Containers 25 ride on roller 24 and move along the main line as the belt 14 is driven by motor 18.

Side wall 11 is cut away at various locations along the main line L, and vertical walls 11a, 11b attached to wall 11 extend perpendicularly thereto. Walls 11a, 11b are spaced apart to define branch lines L1, L2, etc. Two, five ten, twenty or more branch lines may be provided along the main line which may be straight or curved. Extending across the main line and into the entrances of the branch lines are pairs of endless chains 26. Each pair of chains is entrained on drive sprockets 28 carried by a drive shaft 30 driven by motor 32. The motor 32 and shaft 30 are supported by an extension 33 of the framework, attached to the side wall 12 at cut away portions 31. A lug 34 is attached to one link 35 of each chain 26. The lugs on the two chains are aligned with each other in the longitudinal direction of the conveyor line L. These lugs project outwardly of the chains, so that when the chains are driven, the lugs come around above belt section 15 and engage one side of a container 25 located at the entrance of the branch line to transfer the container to the branch line.

In each branch line are short idler rollers 36 having shafts 38 journaled in the side walls 11a, 11b. These rollers terminate near idler shaft 39 carrying idler sprockets 40 on which the chains are entrained. Beyond shaft 39 in each branch line are provided further rollers 42. These rollers may be located in progressively lower positions to define gravitational drive means for a container 25' transferred to the branch line. Alternatively rollers 42 may be driven positively by an arrangement like belt 14 in the main line.

In order to insure that the heavy loaded container 25 stops in precise alignment with the entrance to a branch line to which it is to be transferred, there is provided a stop bar assembly 44. This assembly as best shown in FIGS. 1, 3 and 4, includes a channel shaped resilient bumper 46 mounted on top of a solenoid driven plunger plate 48. Plate 48 is movable vertically in a rectangular casing 49 secured in openings in side walls 11 and 12. The casing contains a solenoid 50 which extends around magnetic plate 48 and drives the plate up when the solenoid is energized. When the solenoid is deenergized, the plate 48 carrying bumper 46 retracts of its own weight into casing 49. The assembly 44 is normally located in retracted position just above the upper belt course 15 and below the horizontal plane P defined by the tops of rollers 24; see FIG. 3.

An electromagnet 60 is further provided to cooperate with the stop bar assembly 44. This electromagnet has a rectangular structure as shown in FIGS. 1, 3 and 5. Coil 62 of the electromagnet is wound around lower horizontal arm 63 of the electromagnet. The upper horizontal arm 64 of the electromagnet is located very slightly below the plane P. When the electromagnet is energized it magnetically attracts and engages the magnetic bottom of container 25 to prevent it from moving along the main line L of the conveyor.

In order to identify the branch line into which a container 25 is to be transferred, there is provided a photoelectric unit 66 supported on a post 68 slightly in advance of each branch line at one side of main line L. A lamp 70 for illuminating a photoelectric cell 71 in the unit 66 is located at the other side of the main line L on post 69. The photoelectric cell and lamp are aligned along optical line of sight S indicated in FIG. 1. The photoelectric units at the several branch lines are located at different elevations or levels and the cooperating lamps are located at the same levels respectively.

Each container 25 is provided with a branch line selector 75 in the form of a long, flat slat 72 terminating in a rectangular opaque cross head 74; see FIGS. 3, 7 and 8. The slat 72 has notches 76 formed at opposite edges. On the slats are numerals or symbols 77 aligned with the respective notches and identifying the several branch lines. Slat 72 fits into a flat tubular bracket 80 on one side wall of container 25. An opening 81 in the bracket exposes a particular numeral 77. Springs 82 at opposite edges of the bracket extend through slots 84 and engage in the notches 76 to hold the selector 75 in an upright position so that the head 74 will cross and interrupt the line of sight S of a particular photoelectric cell-illuminating lamp array at whatever level head 74 is held. The numeral 77 exposed at bracket opening 81 corresponds to a selected corresponding branch line. The system will operate to halt the container 25 and transfer it to the selected branch line when the stopping and transfer circuit and mechanism is triggered by the passage of selector 75 across the line of sight S of the cell-lamp assembly at the selected branch line.

FIG. 9 shows a circuit 100 which is provided for actuating the container stopping and transfer mechanism at a branch line. Similar circuits 100 are provided for all the branch lines.

In circuit 100, a high power supply 102 is provided for energizing solenoid 50, electromagnet 60 and motor 32. The circuit includes three similar thermal time delay relays 104, 105 and 106. These relays have resistance heater elements 107, 108 and 109, bimetallic thermoelements 110, 111 and 112. Each thermoelement carries a conductive contact 114, 116 or 118 which is normally spaced from a pair of fixed contacts but which bridges the contacts when the thermoelement is sufficiently heated. Relay 104 has contacts 119, 120. Relay 105 has contacts 122, 123 and relay 106 has contacts 124, 125.

Lamp 70 is connected to power supply 102 via switch 130. Photoelectric cell 71 is a photoconductive type of cell which normally has a high internal resistance that is reduced when light of certain intensity impinges on the cell. The cell is disposed in line of sight S to receive light from lamp 70. The cell is connected to power supply line 132 via resistor 133 and to coil 134 of instant acting relay 135. Coil 134 is connected to ground return line 136 of the power supply.

Relay 135 has a fixed contact 138 connected to one end of each relay heater element 107, 108 and 109. Movable contact 140 of the relay is connected to ground return line 136 of the power supply. The other end of each relay heater element is connected to power supply line 132.

Solenoid 50 is connected between relay contact 125 and return line 136. Electromagnet coil 62 is connected between relay contact 122 and return line 136. Motor 32 is connected between relay contact 119 and return line 136. Relay contacts 120, 123 and 124 are connected to power supply line 132.

In describing operation of the conveyor system including each of circuits 100 associated with the respective branch lines, it will be assumed that containers 25, one at a time pass along the main line on continuously driven rollers 24. Each container carries a branch line selector 75 with its head 74 located at a particular height or level to intercept and interrupt the optical line of sight S at the branch line identified by the particular numeral 77 appearing in opening 81 of the holding bracket 80.

It will be assumed that switch 130 is closed to light the lamp 70 so that the relays 135 are energized in all circuits 100. This occurs because the resistances of the cells 71 are lowered due to their illumination by lamps 70. Thus current flows through coils 134 and relay contacts 138, 140 in all circuits open. The circuit is now alert and ready for triggering the container stopping and transfer mechanism when a selector 75 arrives at its designated branch line. It will be understood that the cell-lamp assemblies are located at progressively lower elevations so that the highest selector set at numeral "L2" actuates the photoelectric circuit at the first branch line L1, the next lower selector set at numeral "L2" actuates the photoelectric circuit at the second branch line L2, etc.

Suppose that line of sight S of the cell-lamp assembly at the first branch line L1 is interrupted by head 74 of a selector 75 as container 25 passes along the main line L approaching branch line L1. Relay contacts 138, 140 which were open now close. The relay heater elements 107, 108 and 109 all are energized and start to heat up elements 110, 111 and 112, respectively. This continues until the long head 74 of the selector 75 passes line of sight S. By then the elements 110, 111 and 112 are sufficiently heated and the relay contact pairs 119, 120; 122, 123 and 124, 125 are bridged by contacts 114, 116 and 118 respectively. This closes the power supply circuits of the motor 32, electromagnet coil 62 and solenoid 50 respectively.

At this point the electromagnet is energized and starts to brake the movement of container 25 passing over it due to magnetic attraction with magnetic metal bottom of the container. Solenoid plunger plates 48 is extended upwardly and awaiting the arrival of the leading end of the container. The motor 32 has started to drive the chains 26 so that lugs 34 at the underside of belt section 15 begin to move toward side wall 12 of the framework 10. When the container reaches elevated bumper bar 46, the container is stopped. At this instant the electromagnet becomes deenergized and no longer attracts the underside of the container. The solenoid 50 remains energized while lugs 34 of the chains come around and start moving the container 25 laterally off the main line into the branch line. The bumper bar stays up until the container is wholly transferred to the branch line clear of the main line. Then the solenoid 50 becomes deenergized. The motor 32 continues to drive the container 25 laterally until it rides off of rollers 36 and on to rollers 42. The lugs 34 then move downwardly under rollers 36 as shown in FIG. 6 and the motor 32 stops. The motor stops due to cooling off of thermoelement 110 which moves away from contacts 119, 120 to open the power supply circuit of the motor. Similarly the electromagnet 60 and solenoid 50 become deenergized when their power supply circuits open as their thermoelements 111 and 112 respectively cool off. The several relays 104, 105 and 106 are selected so that they heat up and cool off in predetermined times to complete a cycle of transfer of container 25 to a selected branch line in a predetermined time. This cycle time extends from the instant selector head 74 first interrupts a certain line of sight S of a cell-lamp array until the transferred container is passed on to rollers 42.

The apparatus operates automatically on successive containers distributing them to their designated branch lines. The containers should be spaced apart sufficiently on the main line so that each container is transferred to a branch line at the end of transfer cycle before the next container arrives at the sight line S.

It will be noted that each container 25 is momentarily stopped before its lateral transfer begins. During this instant the rollers 24 under the container may continue to turn but they will slip frictionally against the container as the belt section 15 continues to drive them. The electromagnet 60 serves only as a brake and cooperates with the assembly 44 in stopping the heavily loaded container. Thereafter, the bumper bar 46 serves as a stationary guide for the leading end of the container while the container is transferred laterally to the branch line.

The system can be arranged so that the full transfer cycle takes only a few seconds so that rapid delivery and distribution of containers to the branch lines can be effected. The system may have any desired length and may have as many branch lines as desired.

What is claimed is:
1. A conveyor system for heavy containers, comprising a framework, a plurality of rotatable rollers supported by said framework in an elongated horizontal array defining a main conveyor line, said rollers being axially horizontal and spaced apart along said conveyor line, a drive belt supported under the rollers in frictional contact therewith to rotate the rollers and advance containers riding on the rollers along said conveyor line, a plurality of framework extensions opening laterally from said framework at spaced positions along said conveyor line, other rollers rotatably supported by said framework extensions to define a plurality of branch conveyor lines, electrically operable transfer means for moving designated containers laterally into selected branch conveyor lines, photoelectric means located along the main line in advance of the respective branch lines for sensing the presence of designated containers assigned to selected ones of the branch lines, and circuit means interconnecting said photoelectric means and the container transfer means for selectively and automatically transferring the designated containers into the respective selected branch conveyor lines when each designated container arrives at an entrance to a corresponding selected branch conveyor line, stationary electromagnet means for braking movement of a designated container when it arrives at the photoelectric means of a corresponding selected branch conveyor line, other circuit means interconnecting the photoelectric means and electromagnet means for energizing the electromagnet to magnetically engage the designated container, solenoid operated bumper means for stopping movement of each container along the main line when the container arrives at the entrance to a selected branch conveyor line, further circuit means interconnecting said photoelectric means and the solenoid operated bumper means to actuate the same when a designated container arrives at the entrance to a corresponding selected branch conveyor line, each of said circuit means comprising a different time delay relay, a power supply connected in circuit with each time delay relay, with said transfer means, with said solenoid operated bumper means and with said electromagnet means, the several time delay relays having different operative times, so that the electromagnet is deenergized before a designated container is moved laterally into a selected branch line by the transfer means, and so that the bumper means is actuated when the electromagnet is energized and remains energized until the designated container is transferred into the selected branch conveyor line, said photoelectric means comprising a lamp and photoelectric cell array supported at opposite sides of the main conveyor line at each branch conveyor line in a horizontal line of sight, the arrays of lamps and cells being disposed at successively lower heights along the main line, a branch conveyor line selector carried by each container at a certain height for interrupting the line of sight of a lamp and cell array at only a certain selected branch conveyor line, and means for adjusting the height of each selector on each container.

2. A conveyor system as recited in claim 1, wherein each of the selectors has a long horizontally disposed head for interrupting the line of sight of a lamp and cell array during a predetermined length of time sufficient to energize the relays.

References Cited by the Examiner

UNITED STATES PATENTS

| | | | |
|---|---|---|---|
| 1,904,837 | 4/1933 | Posey | 198—38 |
| 1,934,377 | 11/1933 | Robbins | 198—38 |
| 2,033,645 | 3/1936 | Parkhill | 198—38 X |
| 2,043,293 | 6/1936 | Jennings | 198—38 X |
| 2,726,752 | 12/1955 | Maher | 198—41 |
| 2,924,323 | 2/1960 | Holben | 198—1 |
| 3,128,879 | 4/1964 | Birchall | 209—111.7 |
| 3,227,886 | 1/1966 | Bunigan et al. | 250—223 |

EVON C. BLUNK, *Primary Examiner.*

M. L. AJEMAN, *Assistant Examiner.*